UNITED STATES PATENT OFFICE.

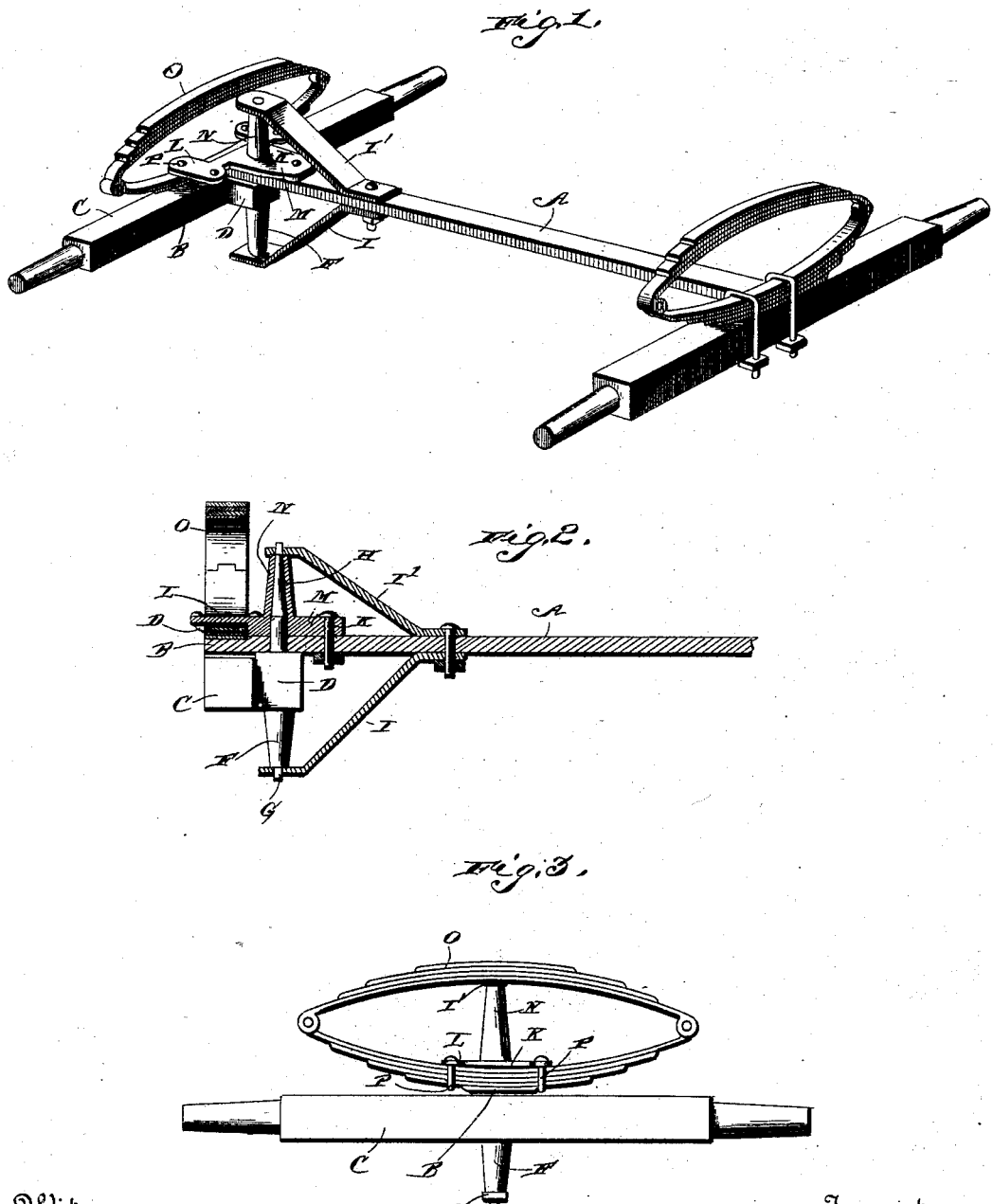

SEVER N. BELGUM, OF MOUNT VERNON, WISCONSIN.

VEHICLE RUNNING-GEAR.

SPECIFICATION forming part of Letters Patent No. 374,923, dated December 20, 1887.

Application filed May 25, 1887. Serial No. 239,341. (No model.)

*To all whom it may concern:*

Be it known that I, SEVER N. BELGUM, a citizen of the United States, residing at Mount Vernon, in the county of Dane and State of Wisconsin, have invented a new and useful Improvement in Vehicle Running-Gears, of which the following is a specification.

My invention relates to an improvement in vehicle running-gears; and it consists in the peculiar construction and combination of devices that will be more fully set forth hereinafter, and particularly pointed out in the claims.

In the drawings, Figure 1 is a perspective view of an apparatus embodying my improvements. Fig. 2 is a vertical longitudinal sectional view of the same. Fig. 3 is a front elevation of the same.

A represents the reach, which is preferably made of metal, and is provided at its front end with an enlarged T-shaped head, B.

C represents the front axle, to the rear side of which, at the center thereof, is welded the squared central portion, D, of the king-bolt E. The said king-bolt has a downward-projecting spindle, F, provided at its lower end with a reduced stud, G, and from the upper end of the squared portion D of the king-bolt projects a vertical spindle, H, which extends through an opening in the reach near the front end of the latter.

I represents a brace-bar, which is bolted to the under side of the reach at a suitable distance in rear of the king-bolt, and the said brace-bar is bent downward and forward, and is provided at its front end with an opening which engages the stud G on the lower end of the king-bolt. A similar brace, I', is bolted to the upper side of the reach, and has its front end pivotally connected to the upper end of the king-bolt.

K represents a plate, which is provided on its front side with a T-shaped head, L, and has a rearward-extending arm, M. The central portion of the plate is provided with an upwardly-extending sleeve or ferrule, N. This plate is bolted to the upper side of the front end of the reach, and the ferrule engages the spindle H of the king-bolt, and thereby the latter is adapted to turn in the said ferrule with the front axle. The head L of the plate K extends over the head on the front end of the reach.

O represents the front spring, which has its lower central portion arranged between the opposing sides of the heads L and B, and the said spring is rigidly clamped to the head L by means of clip-bolts P, the arms of which extend upward through openings with which the head L is provided.

From the foregoing description it will be understood that the king-bolt is rigidly secured to the axle and is adapted to turn therewith, and thereby the axle is not weakened.

By providing the front end of the reach with the enlarged head B, and providing the plate K with the enlarged head L, to rest over the head B, and also with the ferrule or sleeve N, to receive the upper shank of the king-bolt, the axle is firmly connected to the front end of the reach, and a very secure seat is provided for the front spring. Moreover, a gear thus constructed is extremely simple, is very strong and durable, and can be manufactured at a slight cost.

Having thus described my invention, I claim—

1. In a vehicle running-gear, the combination of the front axle having the king-bolt rigidly secured thereto and turning therewith, and provided with the upward and downward projecting spindles, the reach having its front end pivoted on the upper spindle of the king-bolt, and the brace-rods I and I', bolted to the upper and lower sides of the reach, and having their front ends provided with openings engaging the extremities of the spindles of the king-bolt, substantially as described.

2. The combination of the reach, the axle, the king-bolt rigidly secured to the axle and provided with the upward-projecting spindle H, and the plate K, secured on the upper side of the reach and having the ferrule or sleeve N, engaging the upper end of the king-bolt, substantially as described.

3. The combination of the reach having the head B at its front end, the front axle having the king-bolt rigidly secured thereto or formed therewith, the plate K, secured on the upper side of the reach and having the ferrule or sleeve N, engaging the upper portion of the king-bolt, and in which the latter turns, the said plate being further provided with the head L, arranged over the head B, and the spring having its lower side secured between the opposing sides of the heads D and L, substantially as described.

In testimony that I claim the foregoing as my own I have hereto affixed my signature in presence of two witnesses.

SEVER N. BELGUM.

Witnesses:
ELLA BRADER,
OLE G. LEE.